United States Patent [19]
Barbulescu et al.

[11] Patent Number: 6,004,468
[45] Date of Patent: Dec. 21, 1999

[54] SERIAL DRUM APPARATUS AND METHOD FOR PROCESSING WET MATERIAL

[76] Inventors: Adrian Barbulescu, #217 - 2995 Princess Crescent, Coquitlam, British Columbia, Canada, V3B 7N1; Joana Barbulescu, 1294 Jordan Street, Coquitlam, British Columbia, Canada, V3B 6M7

[21] Appl. No.: 09/118,427

[22] Filed: Jul. 17, 1998

[51] Int. Cl.[6] .................................................. B01D 33/06
[52] U.S. Cl. ......................... 210/739; 210/741; 210/770; 210/771; 210/772; 210/774; 210/784; 210/103; 210/217; 210/396; 210/402; 100/37; 100/73; 100/112; 100/121; 100/153; 100/174; 34/338; 34/399; 34/443; 34/482; 34/499; 34/127; 34/129; 34/130
[58] Field of Search ..................................... 210/784, 400, 210/401, 402, 739, 741, 768, 770, 771, 772, 774, 103, 396, 209, 210, 211, 216, 217; 100/37, 116, 121, 151, 153, 73, 90, 112, 174; 34/338, 398, 399, 443, 482, 499, 127, 129, 130

[56] References Cited

U.S. PATENT DOCUMENTS

| | | |
|---|---|---|
| 2,365,658 | 12/1944 | Schumacher . |
| 3,695,448 | 10/1972 | Johansson . |
| 3,780,863 | 12/1973 | Light . |
| 3,878,698 | 4/1975 | Fritesson et al. ........................ 100/121 |
| 3,962,091 | 6/1976 | Doria et al. . |
| 4,101,374 | 7/1978 | Nebel et al. . |
| 4,136,031 | 1/1979 | Jakobsen . |
| 4,220,537 | 9/1980 | Takahashi et al. . |
| 4,370,231 | 1/1983 | LaValley . |
| 4,374,729 | 2/1983 | Frykhult . |
| 4,516,674 | 5/1985 | Firth . |
| 4,534,868 | 8/1985 | Barbulescu et al. . |
| 4,565,602 | 1/1986 | Haartii et al. . |
| 4,750,340 | 6/1988 | Anderson . |
| 4,769,986 | 9/1988 | Kokkonen et al. . |
| 4,952,314 | 8/1990 | Henricson et al. . |
| 4,957,630 | 9/1990 | Bratten . |
| 4,986,881 | 1/1991 | Funk . |
| 4,988,239 | 1/1991 | Firth . |
| 5,051,041 | 9/1991 | Firth . |
| 5,205,941 | 4/1993 | Funk et al. . |
| 5,213,686 | 5/1993 | Funk et al. . |
| 5,344,575 | 9/1994 | Boulet et al. . |
| 5,485,909 | 1/1996 | Hay . |
| 5,656,162 | 8/1997 | Nilsson . |
| 5,667,642 | 9/1997 | Luthi . |
| 5,722,264 | 3/1998 | Antkowiak . |

FOREIGN PATENT DOCUMENTS

959792  12/1974  Canada .

OTHER PUBLICATIONS

Kamyr, Inc., Ring Press Information Guide, Bulletin No. KGD1804–MEO189.
Stamet Inc., The Stamet Solids Pump System, "Leadership in Solids Transfer and Metering Systems", 1994.
Machinery and production engineering, "A major step forward in aluminium extrusion", Jan. 20/27, 1982, p. 58–59.

*Primary Examiner*—Robert Popovics
*Attorney, Agent, or Firm*—Kolisch Hartwell Dickinson McCormack & Heuser

[57] ABSTRACT

An apparatus for processing a solid-liquid material comprises a housing formed with a series of interconnected chambers defined by chamber walls with at least two drums mounted in series within the chambers. Each chamber receives one of the at least two drums for rotatable movement therein. Each chamber and the associated drum are dimensioned to define a region therebetween to retain the solid-liquid material. The regions of adjacent chambers communicate with each other to define a continuous passage from drum to drum through the apparatus. An inlet in the housing admits the solid-liquid material to the passage, and an outlet permits extraction of a processed solid-liquid material from the passage. Each drum rotates in a direction opposite to the adjacent drum to advance the solid-liquid material through the passage from drum to adjacent drum in a sinuous path such that the curvature of the solid-liquid material changes when passing from drum to adjacent drum. Methods for processing the solid-liquid material using the apparatus are also disclosed including filtration, washing, expression of liquid, air drying and compression feeding.

20 Claims, 6 Drawing Sheets

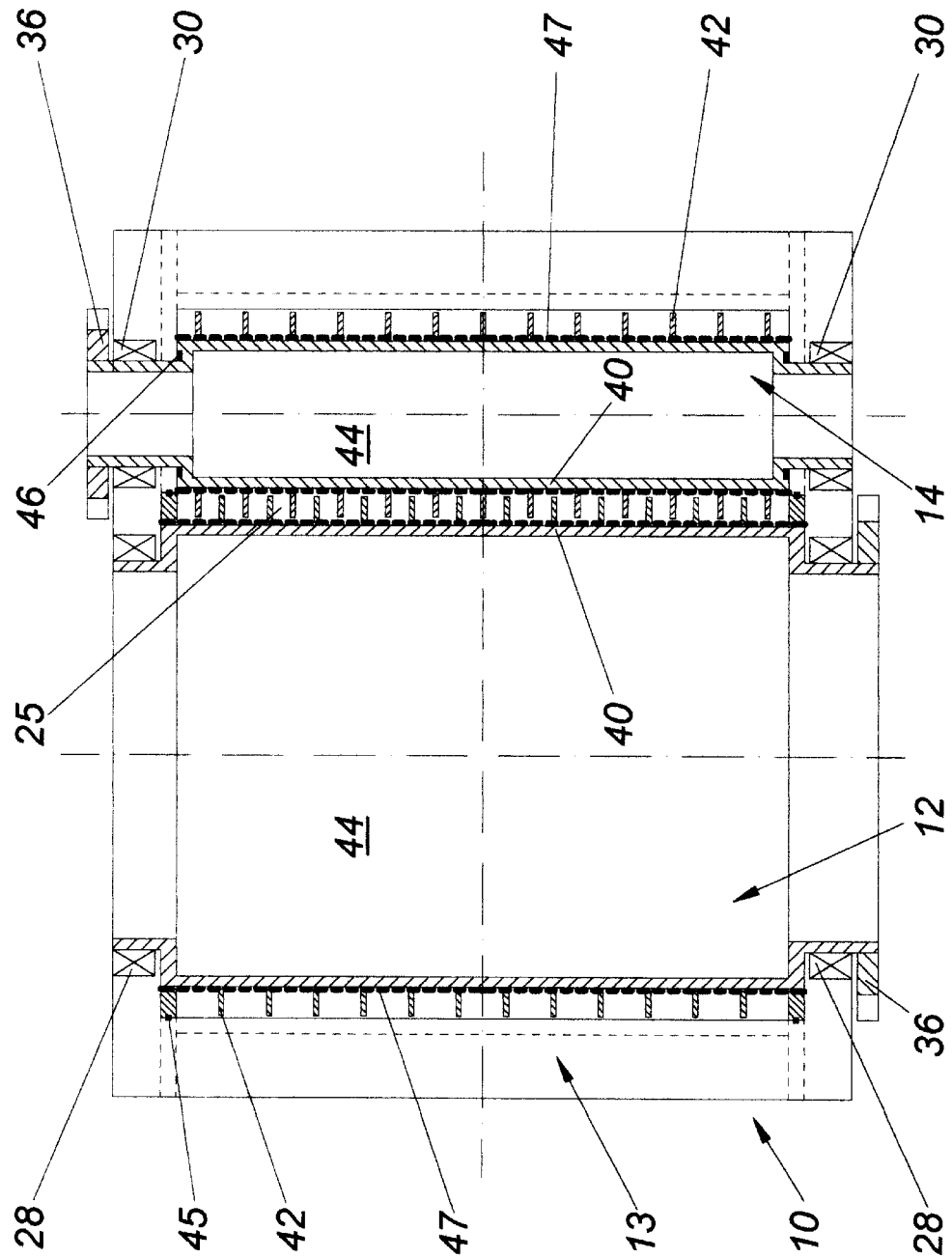

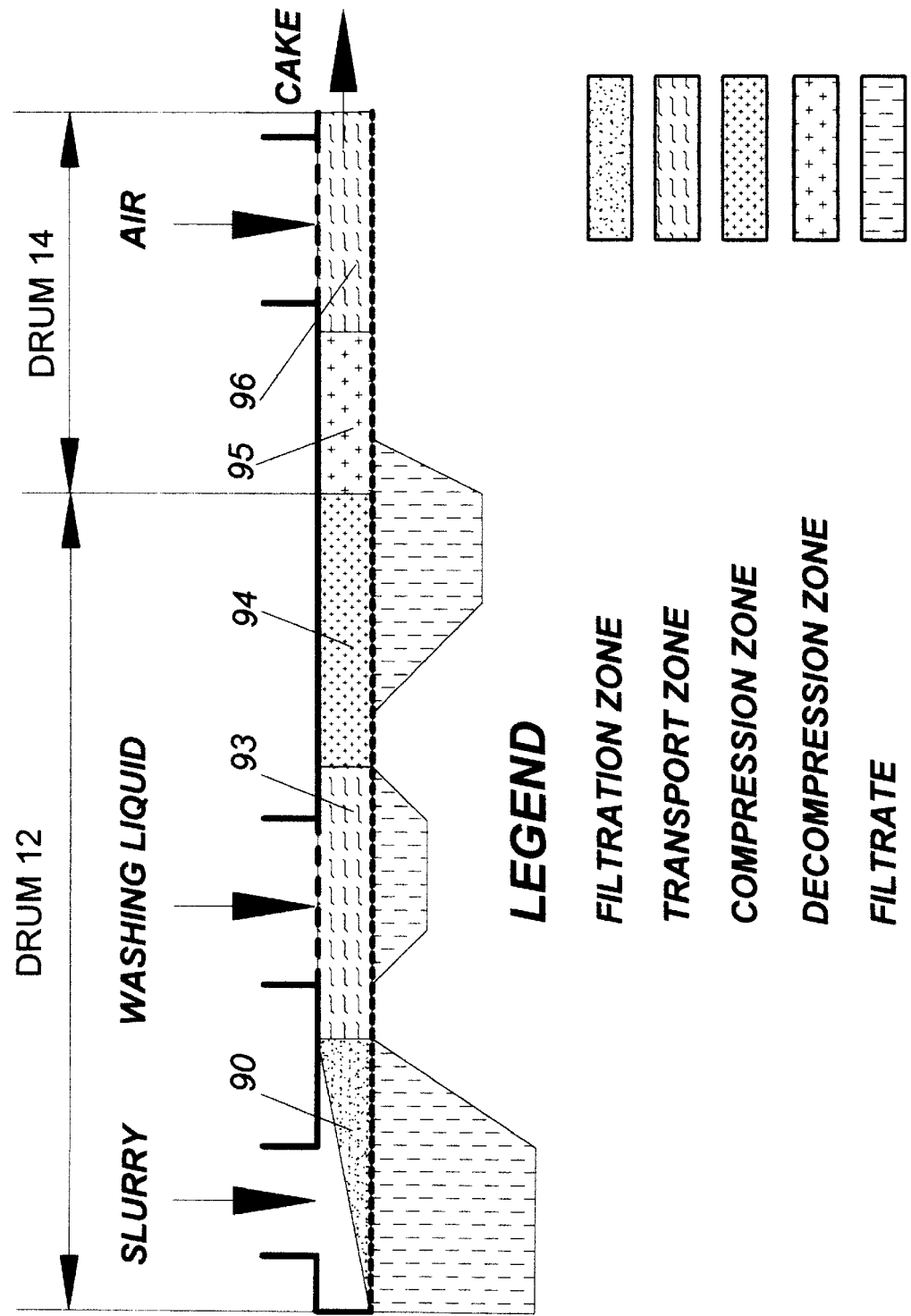

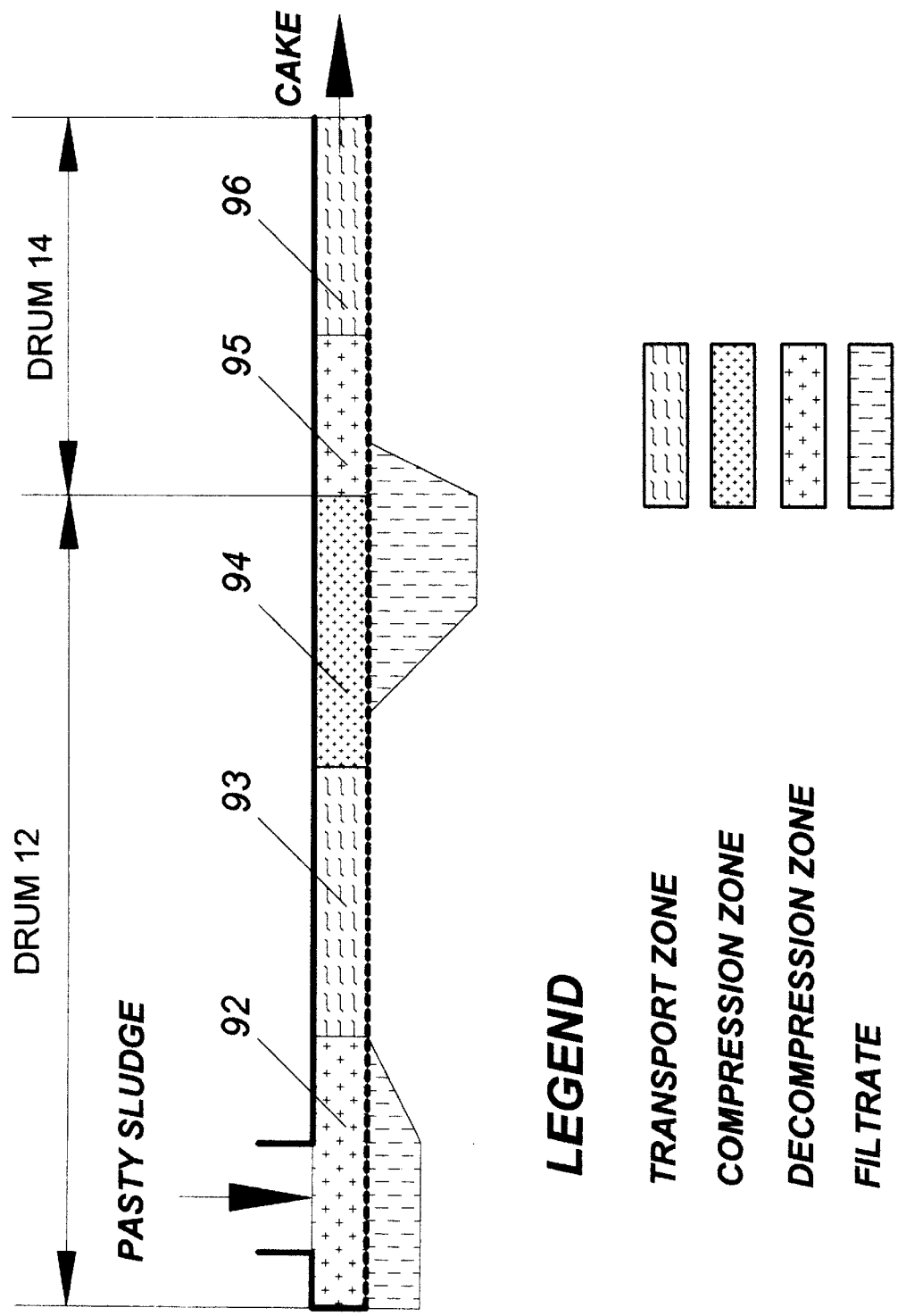

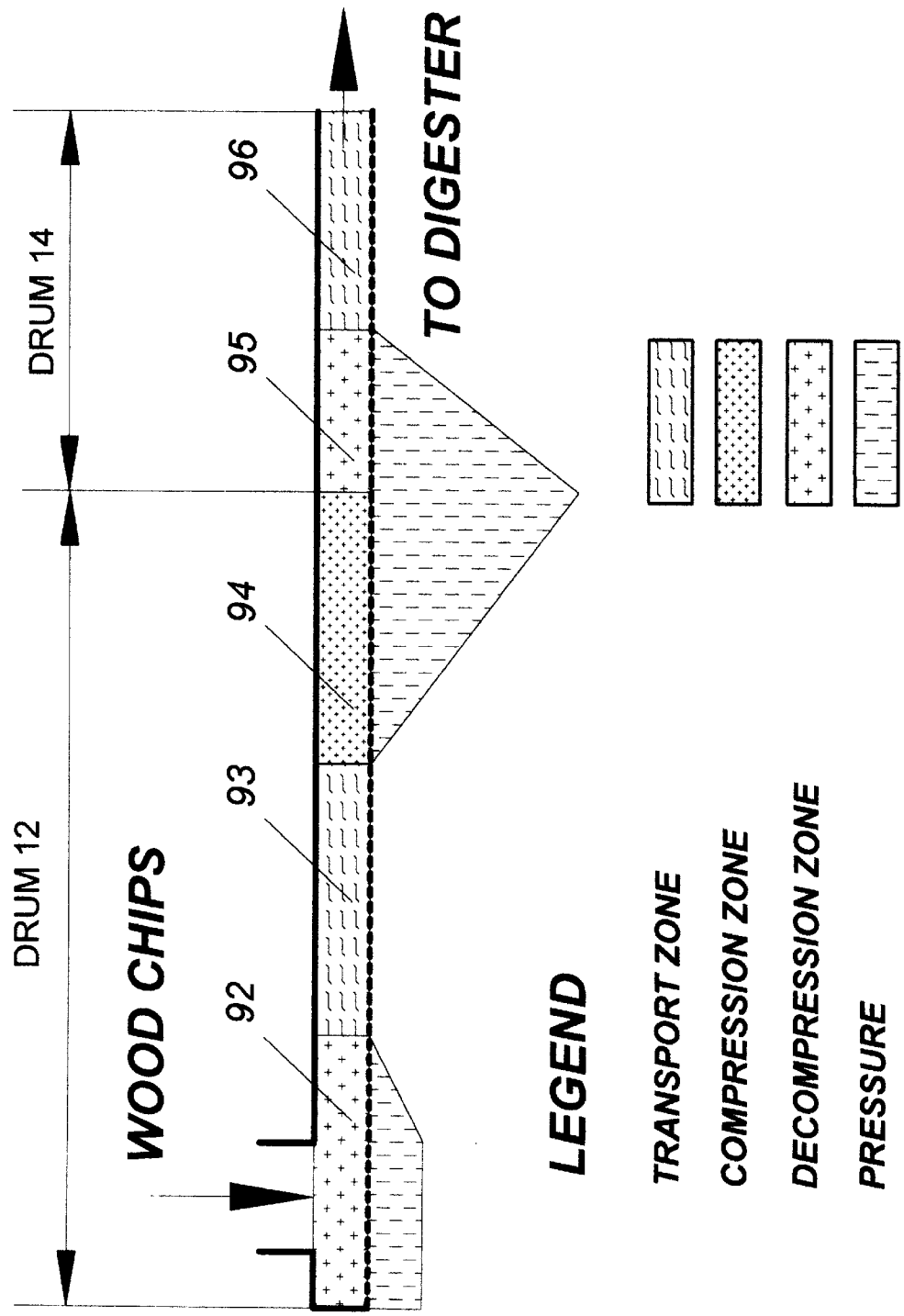

SERIAL DRUM APPARATUS AND METHOD FOR PROCESSING WET MATERIAL

FIELD OF THE INVENTION

This invention relates to a system for processing solid-liquid material such as bulk, paste or slurry material. It finds particular application as a system for continuous extraction of liquid from material by exerting pressure on the material or as a system for compression feeding of material.

BACKGROUND OF THE INVENTION

Apparatus for feeding, compressing, liquid extraction, washing, chemical treatment and air-drying of sludge, slurries or other wet materials are well known. Such equipment finds particular application in the pulp and paper industry, waste water treatment, mineral processing, agriculture, food processing, fisheries, breweries, wineries, chemical processing, oil and tar sands industry, etc.

Most "in batch" systems, like the plate-and-frame or recessed-plate filter press, perform only filtration by using the feed pressure to force the liquid out through the particulate mass of the material undergoing treatment and the filter medium. Some "in batch" systems, like the diaphragm-press, combine filtration and mechanical expression to produce a dryer cake and shorter cycles; they may also perform washing and air-drying in the same pressure chamber as described in U.S. Pat. No. 4,565,602. These "in batch" systems are best suited for low-consistency slurries containing fine particles. They are not particularly effective at treating pastes, and slurries containing large particles. A drawback of all these "in batch" presses is that the particles start filling the pressure chamber at the periphery, then the filtration area diminishes continuously until the cake completely fills the pressure chamber and can be discharged. Moreover, they have some other serious drawbacks: 1) the yield tends to be low, 2) the filter media has to be washed periodically, 3) the cake handling is intermittent, 4) the odours from the material being processed can't be contained, 5) the press equipment is complicated and cumbersome, and 6) the press equipment is expensive to manufacture, operate and maintain.

Continuous systems have been developed to overcome the problems of the "batch" process equipment. The U-channel rotary press described in U.S. Pat. No. 4,534,868 is best suited for pastes and fibrous solid-liquid material, but it is ineffective in handling low-consistency slurries containing fine particles. Conversely, the rotary press described in U.S. Pat. No. 5,344,575 is best suited for low-consistency slurries containing large particles, but it is ineffective in treating slurries containing fine particles, pastes, and fibrous solid-liquid materials. Moreover, both rotary presses have some other serious drawbacks: 1) they can not perform washing and air-drying, 2) each processing channel of the equipment has to be isolated from the others, totally or partially, by complicated sealing systems, 3) the pressure and the outlet consistency of the material are poorly controlled by squeezing the cake with restricting plates, 4) a slip-stick movement of the cake may occur, 5) the pressure has to be controlled separately for each processing channel, 6) the press design is difficult to optimize since the channel width determines both the cake thickness and the pressure gradient.

The method and apparatus described in U.S. Pat. No. 4,986,881 is a modification of the rotary press described in U.S. Pat. No. 4,534,868 intended to enable it to perform washing and chemical treatment on solid-liquid material. However, it still has all the other drawbacks of the two above mentioned rotary presses.

The compression feeder described in U.S. Pat. No. 5,213,686 is a further modification of the U-channel rotary press described in U.S. Pat. No. 4,534,868 intended to enable the feeder to perform compaction into a plug of such compressible materials as wood chips, high consistency paper pulp, wax and fibrous waste, etc. However, this feeder still suffers from some of the drawbacks of the prior art, namely, the pressure is poorly controlled by squeezing the cake with restricting plates and a slip-stick movement of the cake may occur during processing.

SUMMARY OF THE INVENTION

The present invention provides a serial drum apparatus and method for continuous processing of solid-liquid material that avoids the difficulties of the prior art.

Accordingly, the present invention provides apparatus for processing a solid-liquid material comprising:

a housing;

at least two rotatable drums mounted in series in the housing to define a continuous curvilinear passage about the circumference of the drums;

an inlet in the housing to admit the solid-liquid material to the passage; and an outlet for extracting a processed solid-liquid material from the passage;

each of the at least two drums rotating in a direction opposite to the adjacent drum to advance the solid-liquid material through the passage from drum to adjacent drum in a sinuous path such that the curvature of the solid-liquid material changes when passing from drum to adjacent drum, and the first drum of the at least two drums having a greater capacity for moving the solid-liquid material than subsequent drums so that the material tends to be compressed when being moved through the passage.

In a further aspect, the present invention provides a method for processing a solid-liquid material using at least two rotatable drums having perforate side walls in a housing defining a curvilinear passage about the circumference of the drums comprising the steps of:

feeding the solid-liquid material into the passage;

rotating each drum in a direction opposite to the adjacent drum, the first drum having a greater capacity for moving the solid-liquid material than subsequent drums, to advance the solid-liquid material through the passage under pressure so that liquid is pressed from the solid-liquid material through the perforate side walls of the drum to thicken the solid-liquid material;

guiding the solid-liquid material from drum to drum in a sinuous path in which the curvature of the passage changes at each drum, the change in curvature of the material tending to remove additional liquid; and extracting the processed solid-liquid material from the passage.

One of the operating modes of the apparatus of the present invention is as a filtration apparatus, similar to a conventional filter press, but with a significantly increased production capacity. In addition, processing of a solid-liquid material involving compression feeding, expression, washing or chemical treatment with a final step of expression, air-drying and electro-acoustical treatments may also be carried out with the apparatus and method of the present invention.

The present invention provides a serial drum apparatus for continuous processing of solid-liquid material, which is simpler, smaller and less expensive to manufacture, operate and maintain, as compared with prior art devices.

The present invention also provides a serial drum apparatus for continuous processing of solid-liquid material, which is completely closed to the atmosphere, and thus odours and noxious gases can be controlled.

BRIEF DESCRIPTION OF THE DRAWINGS

Aspects of the present invention are illustrated, merely by way of example, in the accompanying drawings in which:

FIG. 2 is a section view taken along line 2—2 of FIG. 1;

FIG. 3 is a schematic view of the processing steps carried out by the apparatus of FIG. 1 when handling a slurry;

FIG. 4 is a schematic view of the processing steps carried out by the apparatus of FIG. 1 where the material is a pasty sludge that is being dewatered; and FIG. 5 is a schematic view of the processing steps carried out by the apparatus when compression feeding of a bulk material.

DESCRIPTION OF THE PREFERRED EMBODIMENTS

Figure 1:
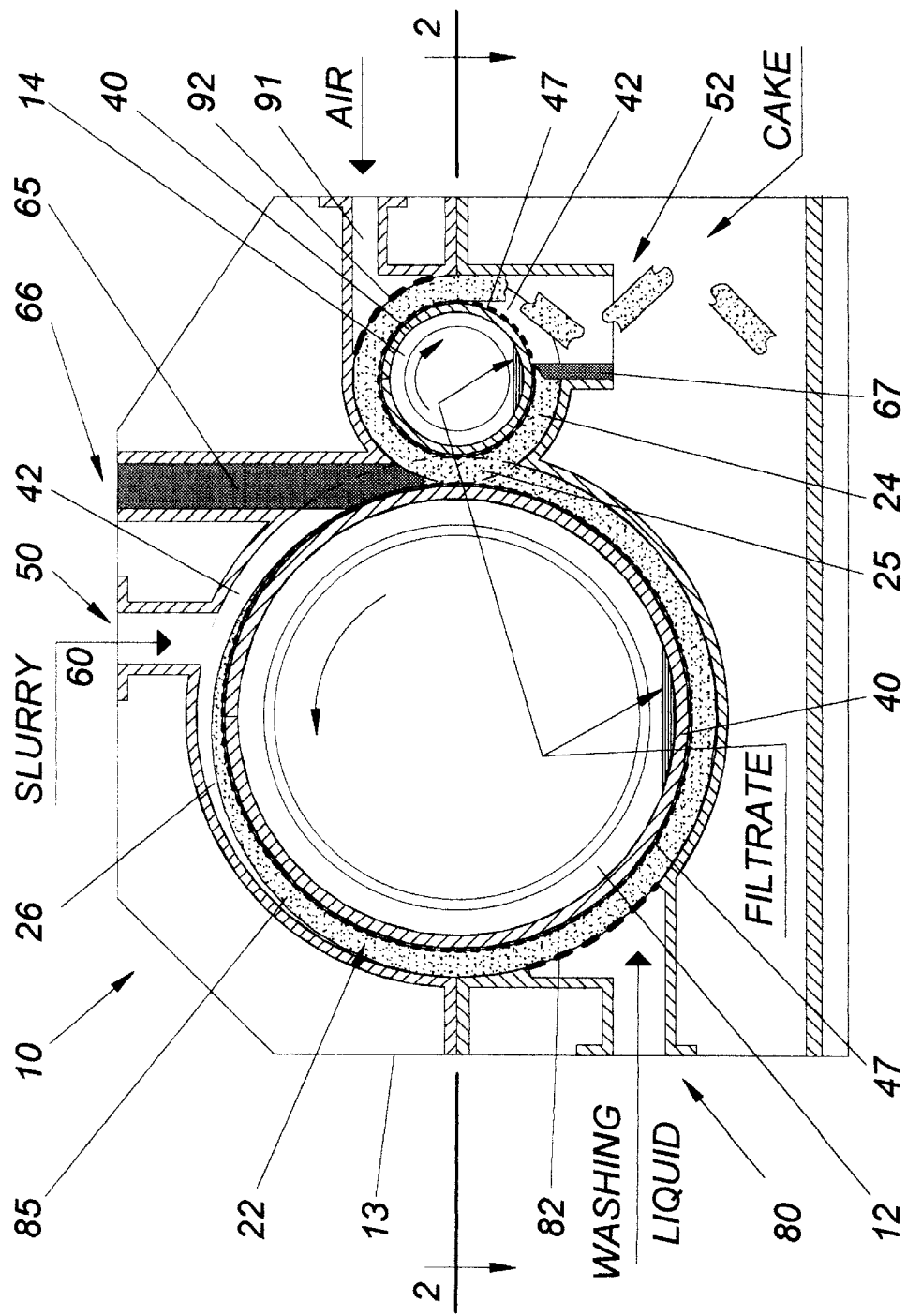
FIG. 1 is an elevation view in section of a preferred embodiment of the apparatus of the present invention that uses a pair of drums.

Referring to FIG. 1, there is shown a preferred embodiment of the serial drum apparatus 10 of present invention useful for processing solid-liquid material. The apparatus of the present invention is not limited to a pair of drums as illustrated in FIG. 1. Three or more serially arranged drums with the outlet of one drum feeding directly into the inlet of the next drum can be used, however, for ease of explanation the dual drum embodiment will be described in detail.

The apparatus of FIG. 1 employs a pair of rotatable drums 12 and 14 mounted in a housing 13. Housing 13 is formed with internal chamber 22 to receive drum 12 and chamber 24 to receive drum 14. The two internal chambers intersect and communicate with each other at region 25.

Drums 12 and 14 are rotatably mounted in series within the chambers. Each chamber and the associated drum therein are dimensioned to define a region to hold solid-liquid material for processing. The regions of adjacent chambers communicate with each other to define a continuous curvilinear passage 26 extending about the circumference of the drums for holding the solid-liquid material to be processed.

FIG. 2 is a top section view taken along line 2—2 of FIG. 1 showing the structure of drums 12 and 14. Bearings 28 rotatably support drum 12 and bearings 30 support drum 14. Each drum is formed with a toothed gear 36 for engagement with a driving motor to rotate the drums.

Each drum comprises a generally cylindrical body having a cylindrical side wall 40. Preferably, the cylindrical side walls 40 of the drums are perforated by openings 43 and enclose a hollow interior 44. Openings 43 are preferably covered by a screen 47. A series of spaced, annular ribs 42 extending about the circumference of the cylindrical side wall mounted to screen 47. As best shown in FIG. 1, ribs 42 extend outwardly from cylindrical side wall 40 of the drum to the wall of the chamber. The ribs tend to exert a force on the solid-liquid material within passage 26 to assist in advancing the material through the passage. Screen 47 and openings 43 permit drainage of liquid from the solid-liquid material into the interior of the drum as the material is advanced through passage 26.

Each rib 42 is generally trapezoidal in cross-section having a base adjacent the cylindrical side wall and an apex adjacent the chamber wall. It has been found that this shape facilitates shedding of the solid-liquid material from the ribs at exit 52 and prevents slip-stick movement of the material in passage 26.

Figure 2A:
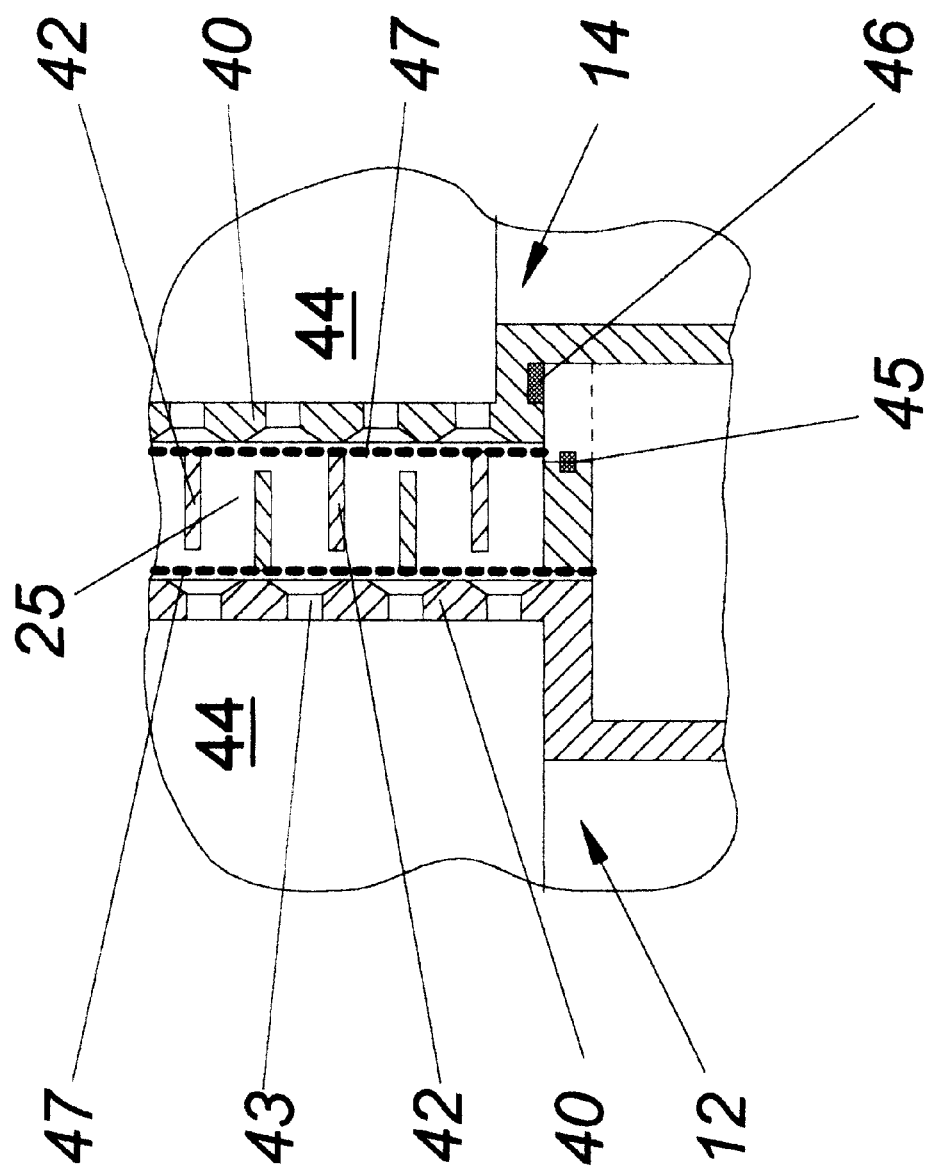
FIG. 2A is a detail view from FIG. 2 of the interference zone between the first and second drums.

The ribs 42 of drum 12 are offset from the ribs of drum 14 so that the ribs of the drums can move between each other as the drums rotate in region 25 where chambers 12 and 14 intersect and the drum ribs overlap. This is best shown in FIG. 2A which is a detail view of region 25. Also shown in FIG. 2A are seals 45 and 46 that seal chambers 22 and 24, respectively, to allow for transport of solid-liquid material under pressure through passage between the drums and the chamber walls.

Referring back to FIG. 1, housing 13 includes an inlet 50 to admit solid-liquid material to be processed to passage 26 about the drums. At the opposite end of the apparatus an outlet 52 is provided to permit extraction of the processed solid-liquid material.

Drums 12 and 14 are rotated in opposite directions via gear 36 associate with each drum. In the illustrated embodiment, drum 12 is rotated in a counterclockwise manner while drum 14 is rotated clockwise. This rotary motion of the drums causes solid-liquid material 60 introduced into passage 26 through inlet 50 to be transported by the drum side walls and drum ribs from drum to adjacent drum in a sinuous path such that the curvature of the solid-liquid material changes when passing from drum 12 to drum 14 in region 25. In addition, first drum 12 of the pair has a greater capacity for moving the solid-liquid material than second drum 14 so that the solid-liquid material is compressed when being moved through the passage. The greater capacity of first drum 12 can be achieved by rotating drum 12 at a higher peripheral speed than drum 14.

To assist in directing the movement of solid-liquid material 60 through passage 26, a flow diverting member is insertable into an appropriately formed opening 66 in housing 13. The flow diverting member is preferably a doctor blade 65 that extends into region 25 between two adjacent chambers to divert flow in passage 26 from drum 12 to drum 14. Blade 65 is positionable to dislodge the solid-liquid material from drum 12 and assist in smoothly directing the material to the adjacent drum 14.

As shown in FIG. 1, the end of blade 65 is insertable into opening 66 to a position adjacent and substantially tangential to the cylindrical wall of drum 12. In order to accomplish this, the end of the blade 65 adjacent the drum wall is formed with a plurality of slots to accommodate movement of the drum ribs 42 past and through the doctor blade.

Referring to FIG. 1, a doctor blade 67 is also provided at outlet 52 for dislodging and diverting processed solid-liquid material from drum 14 and into the outlet.

There is an access port 80 in housing 13 for delivering treatment liquid to the solid-liquid material while undergoing processing in the apparatus. The access port 80 preferably comprises a perforate opening 82 in the chamber wall in communication with a passage connected to a source of treatment liquid under pressure (not shown).

Preferably, there is an additional access port 91 in housing 13 connected to a source of drying air under pressure (not shown) in order to remove further liquid from the material just before it exits the apparatus. Access port 91 preferably includes a perforate opening 92 in the chamber wall in communication with a passage for delivering drying air through the processed solid-liquid material into the interior of the second drum 14.

In operation, solid-liquid material to be treated in bulk or in the form of a pasty sludge or slurry is introduced into inlet 50. In the art, wet bulk material is a material comprised of particulate solids that does not have interstitial liquid and does not flow. An example of a bulk material is wood chips. A paste or pasty sludge is a material with a relatively high solids content and some interstitial fluids that does not flow, while a slurry has a large amount of interstitial fluid and flows freely. FIGS. 3–5 are schematic diagrams showing the processing steps experienced by various solid-liquid materials introduced into the apparatus of the present invention.

As shown in FIG. 3, when a slurry is introduced into the apparatus, filtration initially occurs in a filtration zone 90 where any free liquid starts to drain by gravity or under pressure through screen 47 of drum 12. When the solid-liquid material is a pasty sludge (FIG. 4), the filtration zone is replaced by a decompression zone 92.

The solids retained in the filtration zone form a mat 85 that adheres to screen 47 and becomes a filter element itself. In the case of a slurry, mat 85 thickens as the solid-liquid material is continually added to the apparatus and the material is advanced through the apparatus by rotation of drum 12. Eventually, mat 85 fills passage 26 and reaches a condition where free draining ceases. Following this point, the mat is simply moved in a transport zone 93 by the combined dragging action of screen 47 and radial ribs 42 to a point where further liquid removal is continued by expression.

Washing and chemical treatment steps, which are performed inside the transport zone as shown in FIG. 3, comprise introducing washing or treatment liquid under pressure via a distributor connected to access port 80 so that treatment liquid flows through the mat 85 and through screen 47 into the interior of drum 12.

As shown in FIGS. 3 and 4, expression of further liquid begins in the compression zone 94 following the transport zone 93 of the first drum 12 and continues in the decompression zone 95 of the second drum 14. In compression zone 94, the mass of wet solids has sufficient stiffness to encounter friction with screen 47 and radial ribs 42 causing the wet mass to be dragged along toward the doctor blade 65 which diverts the mass towards second drum 14. In the compression zone of drum 12, pressure increases due to the different transport capacities of the first and second drums. The peripheral speed of the first drum is generally higher than that of the second drum so that material tends to backup in passage 26 with a resulting increase in internal pressure. The pressure in compression zone 94 is adjustable to a pre-determined value resulting in compression of the wet mass and the expression of further liquid through screen 47 to form a de-watered cake. The pressure decreases in the decompression zone 95 of the second drum 14. By virtue of the change of curvature of the wet mass in region 25 as the mass passes from drum to drum, additional liquid tends to be released from the wet mass such that liquid continues to flow for a time through screen 47 of second drum 14. The revolving speed of second drum 14 is determined by monitoring the torque of the first drum 12 or the cake pressure at the junction region 25 of the first and second chambers. The speed of the second drum is then adjusted to establish the desired pressure in compression zone 94. Establishing a pressure in compression zone 94 allows the de-watered cake to be discharged continuously at a desired pressure and consistency. Discharge is performed by moving the processed cake through second transport zone 96 of drum 14 to outlet 52.

Some examples of possible operating modes of the serial drum apparatus of the present invention are as follows:

1. Filtration only (same function as a conventional filter press): The slurry is fed either under pressure or by gravity in the filtration zone 90 of the first drum 12 followed by the transport zone 93. The resulting cake is simply transferred under no significant pressure from the first drum 12 to the transport zone of the second drum 14 and exits the apparatus by free falling. The throughput is controlled by the rotation of drum 12, while the filtration pressure is controlled by the rotation of drum 14 which is set to have a volumetric transport capacity slightly lower than that of drum 12.

2. Expression only (as shown schematically in FIG. 4): The pasty sludge is fed into the decompression zone 92 of the first drum 12, followed by movement into the transport zone 93 and then into compression zone 94. The resulting de-watered cake is then transferred under controlled pressure from the first drum 12 to the decompression zone 95 of the second drum 14. The cake moves through second transport zone 96, and then exits the apparatus by free falling. The expression pressure is controlled by the rotation of drum 14 with its volumetric transport capacity being slightly lower than that of the drum 12.

3. Filtration and expression (similar to a diaphragm filter press): The process is much the same as in the filtration process described above in (1), however, a compression zone at the exit from first drum 12 and a decompression zone at the inlet of second drum 14 are created. The compression pressure is controlled by the rotation of drum 14 with its volumetric transport capacity being lower than that of drum 12.

4. Filtration, washing (or chemical treatment) and expression: This process is similar to the filtration and expression process described above in (3). An additional step is added involving the feeding of the washing liquid (or a chemical agent) under pressure via port 80 through the solid-liquid material while the material is within transport zone 93 of first drum 12

5. Filtration, expression and air drying: This process is the same as the filtration and expression process described above in (3), however, an additional step is added involving the feeding of the drying air into the transport zone 96 of second drum 14 via a distributor so the air flows across the cake through screen 47 of drum 14.

6. Filtration, washing, expression and air drying (as shown schematically in FIG. 3): This process is the same as in (4) with the additional step of feeding drying air inside the transport zone 96 of the drum 14 via a distributor so the air flows across the cake through screen 47 of drum 14.

7. Compression feeding (as shown schematically in FIG. 5): In this process, the solid-liquid material (wood chips or other) is fed under pressure in the decompression zone 92 of the first drum 12, followed by movement through transport zone 93 into compression zone 94. The resulting cake is then transferred under controlled pressure from the first drum to the decompression zone 95 of the second drum, followed by movement through transport zone 96 of the second drum to exit the serial drum processor in the form of a compacted plug of material for entry into the next stage of the process (digester or other). The pressure is controlled by the rotation of drum 14 with its volumetric transport capacity being slightly lower than that of drum 12. There is no significant extraction of liquid from the solid-liquid material.

Although the present invention has been described in some detail by way of example for purposes of clarity and understanding, it will be apparent that certain changes and modifications may be practised within the scope of the appended claims.

I claim:

1. Apparatus for processing a solid-liquid material comprising:

a housing;

at least two rotatable drums mounted in series in the housing to define a continuous curvilinear passage about the circumference of the drums;

an inlet in the housing to admit the solid-liquid material to the passage; and an outlet for extracting a processed solid-liquid material from the passage;

each of the at least two drums rotating in a direction opposite to the adjacent drum to advance the solid-liquid material through the passage from drum to adjacent drum in a sinuous path such that the curvature of the solid-liquid material changes when passing from drum to adjacent drum, and a first drum of the at least two drums having a greater capacity for moving the solid-liquid material than subsequent drums so that the material tends to be compressed when being moved through the passage.

2. Apparatus as claimed in claim 1 in which the housing is formed with a series of interconnected chambers defined by chamber walls, each chamber receiving one of the at least two drums for rotatable movement therein, and each chamber and the drum therein being dimensioned to define a region therebetween to retain the solid-liquid material, the regions of adjacent chambers communicating with each other to define the curvilinear passage.

3. Apparatus as claimed in claim 2 including flow diverting members insertable into the housing at a junction between two adjacent chambers to divert flow in the passage from one drum to the next.

4. Apparatus as claimed in claim 3 in which the flow diverting member is a doctor blade positionable to dislodge the solid-liquid material from one of the drums and assist in smoothly directing the material to the adjacent drum.

5. Apparatus as claimed in claim 2 in which each of the drums comprises a generally cylindrical body having a cylindrical side wall and a series of spaced, annular ribs extending about the circumference of the cylindrical side wall and extending outwardly from the cylindrical side wall to the wall of the chamber, the ribs tending to exert a force on the solid-liquid material to assist in advancing the material through the passage.

6. Apparatus as claimed in claim 5 in which the cylindrical side wall of the drum is perforated and encloses a hollow interior, the perforate cylindrical side wall permitting drainage of liquid from the solid-liquid material into the interior of the drum.

7. Apparatus as claimed in claim 6 in which the ribs of adjacent drums are offset so that the ribs of the drums are rotatable between each other at a junction between two adjacent chambers.

8. Apparatus as claimed in claim 6 including a flow diverting member insertable into the housing at the junction between two adjacent chambers to divert flow in the passage.

9. Apparatus as claimed in claim 8 in which the flow diverting member is insertable to a position adjacent and substantially tangential to the cylindrical wall of the drum, the end of the member adjacent the wall being formed with a plurality of slots to accommodate movement of the ribs past and through the flow diverting member.

10. Apparatus as claimed in claim 6 in which each rib is generally trapezoidal in cross-section having a base adjacent the cylindrical side wall and an apex adjacent the chamber wall.

11. Apparatus as claimed in claim 1 including a doctor blade at the outlet for diverting a processed solid-liquid material from the drum and into the outlet.

12. Apparatus as claimed in claim 1 including one or more access ports in the housing for delivering treatment liquid or drying air to the solid-liquid material while undergoing processing in the apparatus.

13. Apparatus as claimed in claim 12 in which each access port comprises a perforate opening in the chamber wall in communication with a passage connected to a source of treatment liquid or drying air under pressure.

14. Apparatus as claimed in claim 1 in which the drums subsequent to the first drum have a capacity for moving the solid-liquid material less than or equal to that of the subsequent adjacent drum so that the material is passed from drum to the adjacent drum without compression or expansion.

15. A method for processing a solid-liquid material using at least two rotatable drums having perforate side walls in a housing defining a curvilinear passage about the circumference of the drums comprising the steps of:

feeding the solid-liquid material into the passage;

rotating each drum in a direction opposite to the adjacent drum, a first drum of the rotatable drums having a greater capacity for moving the solid-liquid material than subsequent drums, to advance the solid-liquid material through the passage under pressure so that liquid is pressed from the solid-liquid material through the perforate side walls of the drum to thicken the solid-liquid material;

guiding the solid-liquid material from drum to drum in a sinuous path in which the curvature of the passage changes at each drum, the change in curvature of the material tending to remove additional liquid; and extracting the processed solid-liquid material from the passage.

16. A method as claimed in claim 15 including the additional step of introducing treatment liquid into the passage in a distributor so that the treatment liquid flows substantially uniformly into the solid-liquid material.

17. A method as claimed in claim 15 including the additional step of controlling the pressure to which the solid-liquid material is subjected by varying the transport capacities of any two adjacent drums.

18. A method as claimed in claim 17 in which the varying the transport capacities of the drums involves varying the rotation speed of the drums.

19. A method for feeding a wet material under pressure using a first and a second rotatable drum in a housing defining a curvilinear passage about the circumference of the drums, each drum having a cylindrical side wall and a series of spaced, annular ribs extending about the circumference of the cylindrical side wall and extending outwardly from the cylindrical side wall to the wall of the housing, comprising the steps of:

feeding the wet material into the passage;

rotating the first and second drums in opposite directions with the first drum having a greater capacity for moving the wet material than the second drum to create a plug of compressed material;

guiding the plug of compressed material through the passage; and extracting the processed compressed material from the passage.

20. A method as claimed in claim 19 in which the guiding step involves advancing the plug of compressed material from the first drum to the second drum in a sinuous path in which the curvature of the passage changes from the first drum to the second drum, the change in curvature of the material tending to further compact the material.

* * * * *